(12) United States Patent
Morin et al.

(10) Patent No.: US 10,174,146 B2
(45) Date of Patent: Jan. 8, 2019

(54) DUAL CURE ACRYLIC FORMULATIONS AND METHODS TO CURE THEREOF

(71) Applicant: Dymax Corporation, Torrington, CT (US)

(72) Inventors: Michael A. Morin, Bristol, CT (US); Patrick Vaughn, Winsted, CT (US); Marufur Rahim, Avon, CT (US)

(73) Assignee: Dymax Corporation, Torrington, CT (US)

( * ) Notice: Subject to any disclaimer, the term of this patent is extended or adjusted under 35 U.S.C. 154(b) by 0 days.

(21) Appl. No.: 14/712,158

(22) Filed: May 14, 2015

(65) Prior Publication Data

US 2016/0333126 A1 Nov. 17, 2016

(51) Int. Cl.
| C08F 220/54 | (2006.01) |
| C08F 222/10 | (2006.01) |
| C09J 4/00 | (2006.01) |
| C09J 4/06 | (2006.01) |

(52) U.S. Cl.
CPC ...... *C08F 220/54* (2013.01); *C08F 222/1006* (2013.01); *C09J 4/00* (2013.01); *C09J 4/06* (2013.01)

(58) Field of Classification Search
CPC .............. C08F 220/54; C08F 2222/102; C08F 2222/1086; C08F 2220/1875; C08F 226/06; C09J 4/00; C09J 4/06
See application file for complete search history.

(56) References Cited

U.S. PATENT DOCUMENTS

| 4,525,232 | A | 6/1985 | Rooney et al. |
| 4,602,465 | A * | 7/1986 | Peschl .................... B65D 88/08 138/115 |
| 4,605,465 | A * | 8/1986 | Morgan .................. B32B 37/12 156/273.3 |
| 5,385,958 | A | 1/1995 | Bachmann et al. |
| 6,245,827 | B1 * | 6/2001 | Gregory ............... C08G 59/027 522/120 |
| 2006/0142502 | A1 * | 6/2006 | Bischof ............. C08F 222/1006 525/330.3 |
| 2007/0235127 | A1 | 10/2007 | Kuczynski |
| 2008/0071002 | A1 * | 3/2008 | Jethmalani ....... B29D 11/00355 522/31 |

FOREIGN PATENT DOCUMENTS

| CN | 102504745 A | 6/2012 |
| CN | 104098999 A | 10/2014 |
| WO | 2013013589 A1 | 1/2013 |

* cited by examiner

*Primary Examiner* — Sanza L. McClendon
(74) *Attorney, Agent, or Firm* — Greenberg Traurig, LLP (57) ABSTRACT

In some embodiments, the present invention is a method, comprising: a) mixing at least one polymerizable acrylic compound, a thermal initiator, a photoinitiator, and a peroxide to form a mixture, wherein the peroxide has a decomposition temperature; b) exposing the mixture to light for a sufficient first time to generate a first curing agent; and c) after exposing the mixture to light, exposing the mixture to a temperature below the decomposition temperature of the peroxide for a sufficient second time to generate a second curing agent.

20 Claims, 1 Drawing Sheet

DUAL CURE ACRYLIC FORMULATIONS AND METHODS TO CURE THEREOF

FIELD OF THE INVENTION

Some embodiments relate to acrylic formulations, and methods of curing thereof.

BACKGROUND

Acrylic formulations are typically cured ("polymerized") using high temperatures, which may be unsuitable for use on temperature-sensitive substrates. While lower temperature-curable acrylic formulations exist, they can be unstable or hazardous to work with.

SUMMARY

The following embodiments and aspects thereof are described and illustrated in conjunction with systems, tools and methods which are meant to be exemplary and illustrative, not limiting in scope.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

In some embodiments, the present invention is a method, comprising: a) mixing at least one polymerizable acrylic compound, a thermal initiator, a photoinitiator, and a peroxide to form a mixture, wherein the peroxide has a decomposition temperature; b) exposing the mixture to light for a sufficient first time to generate a first curing agent, wherein the light has a wavelength between 220 nm to 600 nm, and wherein the intensity of the light is between 5 mW/cm$^2$ and 10 W/cm$^2$; and c) after exposing the mixture to light, exposing the mixture to a temperature below the decomposition temperature of the peroxide for a sufficient second time to generate a second curing agent.

In some embodiments the mixture lacks an active curing agent prior to exposure to at least one of the light or the temperature below the decomposition temperature of the peroxide.

In some embodiments the sufficient first time is from 5 seconds to 30 seconds.

In some embodiments the sufficient second time is from 15 to 120 minutes.

In some embodiments the temperature below the decomposition temperature of the peroxide is from 50° C. to 100° C.

In some embodiments the at least one polymerizable acrylic compound is selected from the group consisting of urethane acrylate monomers, methacrylate monomers, urethane acrylate oligomers, and methacrylate oligomers.

In some embodiments the at least one polymerizable acrylic compound is from 20 weight percent to 85 weight percent of the mixture.

In some embodiments the photoinitiator is an aromatic ketone selected from the group consisting of benzophenone, benzoin, acetoin, acyloin, diketone, xanthone, thioxanthone, ketocoumarin derivatives, Michler's ketone, benzoin methyl ether, benzoin ethyl ether, 2-hydroxy-2-methylpropiophenone, 1-hydroxycyclohexyl phenyl ketone, 2-Hydroxy-2-methyl-1-[4-(1-methylvinyl)phenyl]propanone homopolymer, 2,2-diethoxyacetophenone, camphorquinone, 2-ethylanthraquinone, 2-tert-butylanthraquinone 2,3-dichloro-1,4-naphthoquinone, 2-hydroxy-4'-(2-hydroxyethoxy)-2-methylpropiophenone, methyl benzoylformate, 2,2-dimethoxy-2-phenylacetophenone, 2-ethylhexy-4-(dimethylamino)benzoate, 2-ethyl-4-(dimethylamino)benzoate, 2-isopropylthioxanthone, 4-phenylbenzophenone, 2-benzyl-2-(dimethylamino)-4'-morpholinobutyrophenone, and combinations thereof.

In some embodiments the photoinitiator is a phosphine oxide selected from the group consisting of diphenyl(2,4,6-trimethylbenzoyl)phosphine oxide, and phenylbis(2,4,6-trimethylbenzoyl)phosphine oxide, and combinations thereof.

In some embodiments the photoinitiator is from 1 weight percent to 6 weight percent of the mixture.

In some embodiments the thermal initiator is selected from the group consisting of salts of dinonylnaphthalene (di)sulfonic acid, hexafluoroantimonate and trifluoromethane sulfonic acid.

In some embodiments the thermal initiator is from 0.1 weight percent to 10 weight percent of the mixture.

In some embodiments the peroxide is selected from the group consisting of t-butyl peroxybenzoate, t-butylperoxy 2-ethylhexanoate, t-butylperoxy 2-ethylhexyl carbonate and cumene hydroperoxide.

In some embodiments the peroxide is from 0.1 weight percent to 5 weight percent of the mixture.

In some embodiments a portion of the mixture is not exposed to the light.

In some embodiments the exposing the mixture to the temperature below the decomposition temperature of the peroxide cures the portion of the mixture that was not exposed to the light.

In some embodiments the at least one polymerizable acrylic compound is diluted with a compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth)acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

In some embodiments the diluent is from 5 weight percent to 70 weight percent of the mixture.

In some embodiments, the present invention is a composition, comprising: at least one polymerizable acrylic compound, wherein the at least one polymerizable acrylic compound is selected from the group consisting of urethane acrylate monomers, methacrylate monomers, urethane acrylate oligomers, and methacrylate oligomers, and wherein the at least one polymerizable acrylic compound is from 20 weight percent to 85 weight percent of the mixture; a thermal initiator, wherein the thermal initiator is selected from the group consisting of salts of dinonylnaphthalene (di)sulfonic acid, hexafluoroantimonate and trifluoromethane sulfonic acid, and wherein the thermal initiator is from 0.1 weight percent to 10 weight percent of the mixture; a photoinitiator, wherein the photoinitiator is an aromatic ketone selected from the group consisting of benzophenone, benzoin, acetoin, acyloin, diketone, xanthone, thioxanthone, ketocoumarin derivatives, Michler's ketone, benzoin methyl ether, benzoin ethyl ether, 2-hydroxy-2-methylpropiophenone, 1-hydroxycyclohexyl phenyl ketone, 2-Hydroxy-2-methyl-1-[4-(1-methylvinyl)phenyl]propanone homopolymer, 2,2-diethoxyacetophenone, camphorquinone, 2-ethylanthraquinone, 2-tert-butylanthraquinone 2,3-dichloro-1,4-naphthoquinone, 2-hydroxy-4'-(2-hydroxyethoxy)-2-methylpropiophenone, methyl benzoylformate, 2,2-dimethoxy-2-phenylacetophenone, 2-ethylhexy-4-(dimethylamino)benzoate, 2-ethyl-4-(dimethylamino)benzoate, 2-isopropylthioxanthone, 4-phenylbenzophenone, 2-benzyl-2-(dimethylamino)-4'-morpholinobutyrophenone, and combinations thereof, and wherein the photoinitiator is from 1 weight percent to 6 weight percent of the mixture; and a peroxide, wherein the peroxide is selected from the group consisting of t-butyl peroxybenzoate, t-butylperoxy 2-ethylhexanoate, t-butylperoxy 2-ethylhexyl carbonate and cumene hydroperoxide, and wherein the peroxide is from 0.1 weight percent to 5 weight percent of the mixture.

In some embodiments the composition further comprises a compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth) acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

In some embodiments the compound is from 5 weight percent to 70 weight percent of the composition.

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. The figures are listed below.

DESCRIPTION

In some embodiments, the present invention a method for curing acrylic formulations comprising a mixture of at least one polymerizable acrylic compound, a thermal initiator, a photoinitiator, and a peroxide, by exposing the mixture to light, wherein the exposure to light generates a first active curing agent; and, after exposing the mixture to light, exposing the mixture to a temperature below the decomposition temperature of the peroxide, wherein the exposure to the temperature below the decomposition temperature of the peroxide generates a second active curing agent.

The Method

In some embodiments, the present invention is a method, comprising: a) mixing at least one polymerizable acrylic compound, a thermal initiator, a photoinitiator, and a peroxide to form a mixture, wherein the peroxide has a decomposition temperature; b) exposing the mixture to light for a sufficient first time to generate a first curing agent; and c) after exposing the mixture to light, exposing the mixture to a temperature below the decomposition temperature of the peroxide for a sufficient second time to generate a second curing agent.

In certain embodiments, the photoinitiator and the thermal initiator in combination with peroxide generates free radicals which causes the polymerization either under UV radiation or heat or both. In certain embodiments, active curing agents, such as free radicals are only created when the mixture is either exposed to at least one of light or heat.

In certain embodiments, the entire mixture may be cured by exposing the mixture to light. Alternatively, a fraction of the mixture may be cured by exposing the mixture to light, and the remainder of the mixture may be cured by exposing the mixture to a temperature below the decomposition temperature of the peroxide. Non limiting examples where a fraction of the mixture is not cured by exposure to light include fractions of the mixture that may be shielded from exposure to the light.

In certain embodiments, the mixture may be first cured by exposure to light, and then further cured by exposing the mixture to a temperature below the decomposition temperature of the peroxide.

The wavelength, duration of exposure and intensity sufficient for curing can be readily determined by one skilled in the art. In certain embodiments, the light has a wavelength between 220 nm to 600 nm. In certain embodiments, the light has a wavelength between 240 nm to 600 nm. In certain embodiments, the light has a wavelength between 260 nm to 600 nm. In certain embodiments, the light has a wavelength between 280 nm to 600 nm. In certain embodiments, the light has a wavelength between 300 nm to 600 nm. In certain embodiments, the light has a wavelength between 320 nm to 600 nm. In certain embodiments, the light has a wavelength between 340 nm to 600 nm. In certain embodiments, the light has a wavelength between 360 nm to 600 nm. In certain embodiments, the light has a wavelength between 380 nm to 600 nm. In certain embodiments, the light has a wavelength between 400 nm to 600 nm. In certain embodiments, the light has a wavelength between 420 nm to 600 nm. In certain embodiments, the light has a wavelength between 440 nm to 600 nm. In certain embodiments, the light has a wavelength between 460 nm to 600 nm. In certain embodiments, the light has a wavelength between 480 nm to 600 nm. In certain embodiments, the light has a wavelength between 500 nm to 600 nm. In certain embodiments, the light has a wavelength between 520 nm to 600 nm. In certain embodiments, the light has a wavelength between 540 nm to 600 nm. In certain embodiments, the light has a wavelength between 560 nm to 600 nm. In certain embodiments, the light has a wavelength between 580 nm to 600 nm.

In certain embodiments, the light has a wavelength between 300 nm to 450 nm. In certain embodiments, the light has a wavelength between 310 nm to 425 nm.

In certain embodiments, the intensity of the light is between 5 mW/cm$^2$ and 10 W/cm$^2$. In certain embodiments, the intensity of the light is between 10 mW/cm$^2$ and 10 W/cm$^2$. In certain embodiments, the intensity of the light is between 20 mW/cm$^2$ and 10 W/cm$^2$. In certain embodiments, the intensity of the light is between 30 mW/cm$^2$ and 10 W/cm$^2$. In certain embodiments, the intensity of the light is between 40 mW/cm$^2$ and 10 W/cm$^2$. In certain embodiments, the intensity of the light is between 50 mW/cm$^2$ and 10 W/cm$^2$. In certain embodiments, the intensity of the light is between 60 mW/cm$^2$ and 10 W/cm$^2$. In certain embodiments, the intensity of the light is between 70 mW/cm$^2$ and 10 W/cm$^2$. In certain embodiments, the intensity of the light is between 80 mW/cm$^2$ and 10 W/cm$^2$. In certain embodiments, the intensity of the light is between 90 mW/cm$^2$ and 10 W/cm$^2$. In certain embodiments, the intensity of the light is between 100 mW/cm$^2$ and 10 W/cm$^2$. In certain embodiments, the intensity of the light is between 200 mW/cm$^2$ and 10 W/cm$^2$. In certain embodiments, the intensity of the light is between 300 mW/cm$^2$ and 10 W/cm$^2$. In certain embodiments, the intensity of the light is between 400 mW/cm$^2$ and 10 W/cm$^2$. In certain embodiments, the intensity of the light is between 500 mW/cm$^2$ and 10 W/cm$^2$. In certain embodiments, the intensity of the light is between 600 mW/cm$^2$ and 10 W/cm$^2$. In certain embodiments, the intensity of the light is between 700 mW/cm$^2$ and 10 W/cm$^2$. In certain embodiments, the intensity of the light is between 800 mW/cm$^2$ and 10 W/cm$^2$. In certain embodiments, the intensity of the light is between 900 mW/cm$^2$ and 10 W/cm$^2$.

In certain embodiments, the intensity of the light is between 1 W/cm$^2$ and 10 W/cm$^2$. In certain embodiments, the intensity of the light is between 2 W/cm$^2$ and 10 W/cm$^2$. In certain embodiments, the intensity of the light is between 3 W/cm$^2$ and 10 W/cm$^2$. In certain embodiments, the intensity of the light is between 4 W/cm$^2$ and 10 W/cm$^2$. In certain embodiments, the intensity of the light is between 5 W/cm$^2$ and 10 W/cm$^2$. In certain embodiments, the intensity of the light is between 6 W/cm$^2$ and 10 W/cm$^2$. In certain embodiments, the intensity of the light is between 7 W/cm$^2$ and 10 W/cm$^2$. In certain embodiments, the intensity of the light is between 8 W/cm$^2$ and 10 W/cm$^2$. In certain embodiments, the intensity of the light is between 9 W/cm$^2$ and 10 W/cm$^2$.

In certain embodiments, the sufficient first time is from 5 seconds to 30 seconds. In certain embodiments, the sufficient first time is from 10 seconds to 30 seconds. In certain embodiments, the sufficient first time is from 15 seconds to 30 seconds. In certain embodiments, the sufficient first time is from 20 seconds to 30 seconds. In certain embodiments, the sufficient first time is from 25 seconds to 30 seconds.

In certain embodiments, the sufficient second time is from 15 to 120 minutes. In certain embodiments, the sufficient second time is from 15 to 120 minutes. In certain embodiments, the sufficient second time is from 15 to 120 minutes. In certain embodiments, the sufficient second time is from 20 to 120 minutes. In certain embodiments, the sufficient second time is from 25 to 120 minutes. In certain embodiments, the sufficient second time is from 30 to 120 minutes. In certain embodiments, the sufficient second time is from 35 to 120 minutes. In certain embodiments, the sufficient second time is from 40 to 120 minutes. In certain embodiments, the sufficient second time is from 45 to 120 minutes. In certain embodiments, the sufficient second time is from 50 to 120 minutes. In certain embodiments, the sufficient second time is from 55 to 120 minutes. In certain embodiments, the sufficient second time is from 60 to 120 minutes. In certain embodiments, the sufficient second time is from 65 to 120 minutes. In certain embodiments, the sufficient second time is from 70 to 120 minutes. In certain embodiments, the sufficient second time is from 75 to 120 minutes. In certain embodiments, the sufficient second time is from 80 to 120 minutes. In certain embodiments, the sufficient second time is from 85 to 120 minutes. In certain embodiments, the sufficient second time is from 90 to 120 minutes. In certain embodiments, the sufficient second time is from 95 to 120 minutes. In certain embodiments, the sufficient second time is from 100 to 120 minutes. In certain embodiments, the sufficient second time is from 105 to 120 minutes. In certain embodiments, the sufficient second time is from 110 to 120 minutes. In certain embodiments, the sufficient second time is from 115 to 120 minutes.

In certain embodiments, the sufficient second time is from 15 to 60 minutes. In certain embodiments, the sufficient second time is from 20 to 60 minutes. In certain embodiments, the sufficient second time is from 25 to 60 minutes. In certain embodiments, the sufficient second time is from 30 to 60 minutes. In certain embodiments, the sufficient second time is from 35 to 60 minutes. In certain embodiments, the sufficient second time is from 40 to 60 minutes. In certain embodiments, the sufficient second time is from 45 to 60 minutes. In certain embodiments, the sufficient second time is from 50 to 60 minutes. In certain embodiments, the sufficient second time is from 55 to 60 minutes.

The duration of exposure and temperatures sufficient for curing can be readily determined by one skilled in the art. In certain embodiments, the temperature below the decomposition temperature of the peroxide is from 50° C. to 100° C. In certain embodiments, the temperature below the decomposition temperature of the peroxide is from 60° C. to 100° C. In certain embodiments, the temperature below the decomposition temperature of the peroxide is from 70° C. to 100° C. In certain embodiments, the temperature below the decomposition temperature of the peroxide is from 80° C. to 100° C. In certain embodiments, the temperature below the decomposition temperature of the peroxide is from 90° C. to 100° C.

In certain embodiments, the temperature below the decomposition temperature of the peroxide is from 60° C. to 100° C. In certain embodiments, the temperature below the decomposition temperature of the peroxide is from 50° C. to 90° C. In certain embodiments, the temperature below the decomposition temperature of the peroxide is from 60° C. to 80° C.

Figure 1:
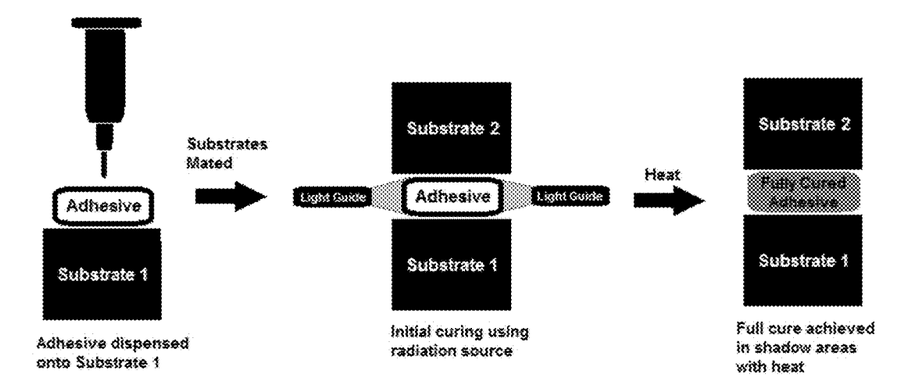
FIG. 1 shows a method of curing an acrylic formulation according to some embodiments.

Referring to the embodiment shown in FIG. 1, in step 1, a mixture is dispensed. In step 2, the mixture is treated with light having a wavelength between about 220 nm and about 600 nm to generate a first curing agent from the photoinitiator. The mixture may be treated with light for a period of time, such as about 5 seconds to about 30 seconds. In step 3, the mixture is heated to generate a second curing agent from the thermal initiator and peroxide. The mixture may be heated in a batch oven for about 15 minutes to about 1 hour. The mixture is heated to a temperature that is selected based on the particular thermal initiator that is used.

The at Least One Polymerizable Acrylic Compound

Non-exclusive examples of polymerizable acrylic compounds include urethane acrylate monomers, methacrylate monomers, urethane acrylate oligomers, and methacrylate oligomers. In certain embodiments, the at least one polymerizable acrylic compound is selected from the group consisting of tetramethylene glycol urethane acrylate oligomer, propylene glycol urethane acrylate oligomer.

In certain embodiments, the at least one polymerizable acrylic compound can be a urethane acrylate or urethane methacrylate oligomers based upon polyethers or polyesters, which are reacted with aromatic, aliphatic, or cycloaliphatic diisocyanates and capped with hydroxy acrylates.

Further examples nonexclusively include difunctional urethane acrylate oligomers such as a polyester of hexanedioic acid and diethylene glycol, terminated with isophorone diisocyanate, capped with 2-hydroxyethyl acrylate (CAS 72121-94-9); a polypropylene glycol terminated with tolyene-2,6-diisocyanate, capped with 2-hydroxyethylacrylate (CAS 37302-70-8); a polyester of hexanedioic acid and diethylene glycol, terminated with 4,4'-methylenebis(cyclohexyl isocyanate), capped with 2-hydroxyethyl acrylate (CAS 69011-33-2); a polyester of hexanedioic acid, 1,2-ethanediol, and 1,2 propanediol, terminated with tolylene-2,4-diisocyanate, capped with 2-hydroxyethyl acrylate (CAS 69011-31-0); a polyester of hexanedioic acid, 1,2-ethanediol, and 1,2 propanediol, terminated with 4,4'-methylenebis(cyclohexyl isocyanate, capped with 2-hydroxyethyl acrylate (CAS 69011-32-1); a polyester of hexanedioic acid, diethylene glycol, terminated with isophorone diisocyanate, capped with 2-hydroxyethyl acrylate (CAS 72121-94-9); a polytetramethylene glycol ether terminated with 4,4'-methylenebis(cyclohexylisocyanate), capped with 2-hydroxyethyl acrylate; and a hydroxy terminated polybutadiene terminated with isophorone diisocyanate, capped with 2-hydroxyethyl acrylate.

Further examples nonexclusively include monofunctional urethane acrylate oligomers, such as a polypropylene terminated with 4,4'-methylenebis(cyclohexylisocyanate), capped with 2-hydroxyethyl acrylate and 1-dodosanol. They also include difunctional urethane methacrylate oligomers such as a polytetramethylene glycol ether terminated with tolylene-2,4-diisocyanate, capped with 2-hydroxyethyl methacrylate; a polytetramethylene glycol ether terminated with isophorone diisocyanate, capped with 2-hydroxyethyl methacrylate); a polytetramethylene glycol ether terminated with 4,4'-methylenebis(cyclohexylisocyanate), capped with 2-hydroxyethyl methacrylate; and a polypropylene glycol terminated with tolylene-2,4-diisocyanate, capped with 2-hydroxyethyl methacrylate. In addition, the above urethane oligomers may use hydroxyl-terminated vinyl ether monomers as capping agents, including but not limited to 4-hydroxybutyl vinyl ether and cyclohexanedimenthanol monovinyl ether.

In certain embodiments, the at least one polymerizable acrylic compound is present in the mixture from 20 weight percent to 85 weight percent. In certain embodiments, the at least one polymerizable acrylic compound is present in the mixture from 25 weight percent to 85 weight percent. In certain embodiments, the at least one polymerizable acrylic compound is present in the mixture from 30 weight percent to 85 weight percent. In certain embodiments, the at least one polymerizable acrylic compound is present in the mixture from 35 weight percent to 85 weight percent. In certain embodiments, the at least one polymerizable acrylic compound is present in the mixture from 40 weight percent to 85 weight percent. In certain embodiments, the at least one polymerizable acrylic compound is present in the mixture from 45 weight percent to 85 weight percent. In certain embodiments, the at least one polymerizable acrylic compound is present in the mixture from 50 weight percent to 85 weight percent. In certain embodiments, the at least one polymerizable acrylic compound is present in the mixture from 55 weight percent to 85 weight percent. In certain embodiments, the at least one polymerizable acrylic compound is present in the mixture from 60 weight percent to 85 weight percent. In certain embodiments, the at least one polymerizable acrylic compound is present in the mixture from 65 weight percent to 85 weight percent. In certain embodiments, the at least one polymerizable acrylic compound is present in the mixture from 70 weight percent to 85 weight percent. In certain embodiments, the at least one polymerizable acrylic compound is present in the mixture from 75 weight percent to 85 weight percent. In certain embodiments, the at least one polymerizable acrylic compound is present in the mixture from 80 weight percent to 85 weight percent.

In certain embodiments, the at least one polymerizable acrylic compound is present in the mixture from 30 weight percent to 80 weight percent. In certain embodiments, the at least one polymerizable acrylic compound is present in the mixture from 40 weight percent to 70 weight percent.

In certain embodiments, the at least one polymerizable acrylic compound is diluted with a compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth)acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

In certain embodiments, the diluent is present in the mixture from 5 weight percent to 70 weight percent. In certain embodiments, the diluent is present in the mixture from 10 weight percent to 70 weight percent. In certain embodiments, the diluent is present in the mixture from 15 weight percent to 70 weight percent. In certain embodiments, the diluent is present in the mixture from 20 weight percent to 70 weight percent. In certain embodiments, the diluent is present in the mixture from 25 weight percent to 70 weight percent. In certain embodiments, the diluent is present in the mixture from 30 weight percent to 70 weight percent. In certain embodiments, the diluent is present in the mixture from 35 weight percent to 70 weight percent. In certain embodiments, the diluent is present in the mixture from 40 weight percent to 70 weight percent. In certain embodiments, the diluent is present in the mixture from 45 weight percent to 70 weight percent. In certain embodiments, the diluent is present in the mixture from 50 weight percent to 70 weight percent. In certain embodiments, the diluent is present in the mixture from 55 weight percent to 70 weight percent. In certain embodiments, the diluent is present in the mixture from 60 weight percent to 70 weight percent. In certain embodiments, the diluent is present in the mixture from 65 weight percent to 70 weight percent.

In certain embodiments, the diluent is present in the mixture from 15 weight percent to 60 weight percent. In certain embodiments, the diluent is present in the mixture from 25 weight percent to 50 weight percent.

The Photoinitiator

In certain embodiments, the photoinitiator photolytically generates free radicals.

Non limiting examples of photoinitiators include aromatic ketones.

In some embodiments, the aromatic ketone is selected from the group consisting of benzophenone, benzoin, acetoin, acyloin, diketone, xanthone, thioxanthone, ketocoumarin derivatives, Michler's ketone, benzoin methyl ether, benzoin ethyl ether, 2-hydroxy-2-methylpropiophenone, 1-hydroxycyclohexyl phenyl ketone, 2-Hydroxy-2-methyl-1-[4-(1-methylvinyl)phenyl]propanone homopolymer, 2,2-diethoxyacetophenone, camphorquinone, 2-ethylanthraquinone, 2-tert-butylanthraquinone 2,3-dichloro-1,4-naphthoquinone, 2-hydroxy-4'-(2-hydroxyethoxy)-2-methylpropiophenone, methyl benzoylformate, 2,2-dimethoxy-2-phenylacetophenone, 2-ethylhexy-4-(dimethylamino)benzoate, 2-ethyl-4-(dimethylamino) benzoate, 2-isopropylthioxanthone, 4-phenylbenzophenone, 2-benzyl-2-(dimethylamino)-4'-morpholinobutyrophenone, and combinations thereof.

In some embodiments, the photoinitiator is a phosphine oxide.

In some embodiments, the phosphine oxide is selected from the group consisting of diphenyl(2,4,6-trimethylbenzoyl)phosphine oxide, and phenylbis(2,4,6-trimethylbenzoyl)phosphine oxide, and combinations thereof.

In certain embodiments, the photoinitiator is present in an amount sufficient to effect polymerization or curing of the at least one polymerizable acrylic compound upon exposure to light.

In some embodiments, the photoinitiator is present in the mixture from 1 weight percent to 6 weight percent of the mixture. In some embodiments, the photoinitiator is present in the mixture from 1.5 weight percent to 6 weight percent of the mixture. In some embodiments, the photoinitiator is present in the mixture from 2 weight percent to 6 weight percent of the mixture. In some embodiments, the photoinitiator is present in the mixture from 2.5 weight percent to 6 weight percent of the mixture. In some embodiments, the photoinitiator is present in the mixture from 3 weight percent to 6 weight percent of the mixture. In some embodiments, the photoinitiator is present in the mixture from 3.5 weight percent to 6 weight percent of the mixture. In some embodiments, the photoinitiator is present in the mixture from 4 weight percent to 6 weight percent of the mixture. In some embodiments, the photoinitiator is present in the mixture from 4.5 weight percent to 6 weight percent of the mixture. In some embodiments, the photoinitiator is present in the mixture from 5 weight percent to 6 weight percent of the mixture. In some embodiments, the photoinitiator is present in the mixture from 5.5 weight percent to 6 weight percent of the mixture.

In some embodiments, the photoinitiator is present in the mixture from 1.5 weight percent to 5 weight percent of the mixture. In some embodiments, the photoinitiator is present in the mixture from 2 weight percent to 4 weight percent of the mixture.

The Thermal Initiator

In certain embodiments, the thermal initiator generates an acid when heated to an activation temperature. Non-limiting examples include salts that release acids such dinonylnaphthalene (di)sulfonic acid, hexafluoroantimonate or trifluoromethane sulfonic acid.

As used herein, "acids" include both Lewis acids and Lowry-Bronsted acids.

In some embodiments, the thermal initiator is present in the mixture from 0.1 weight percent to 10 weight percent of the mixture. In some embodiments, the thermal initiator is present in the mixture from 0.2 weight percent to 10 weight percent of the mixture. In some embodiments, the thermal initiator is present in the mixture from 0.3 weight percent to 10 weight percent of the mixture. In some embodiments, the thermal initiator is present in the mixture from 0.4 weight percent to 10 weight percent of the mixture. In some embodiments, the thermal initiator is present in the mixture from 0.5 weight percent to 10 weight percent of the mixture. In some embodiments, the thermal initiator is present in the mixture from 0.6 weight percent to 10 weight percent of the mixture. In some embodiments, the thermal initiator is present in the mixture from 0.7 weight percent to 10 weight percent of the mixture. In some embodiments, the thermal initiator is present in the mixture from 0.8 weight percent to 10 weight percent of the mixture. In some embodiments, the thermal initiator is present in the mixture from 0.9 weight percent to 10 weight percent of the mixture. In some embodiments, the thermal initiator is present in the mixture from 1 weight percent to 10 weight percent of the mixture. In some embodiments, the thermal initiator is present in the mixture from 1.5 weight percent to 10 weight percent of the mixture. In some embodiments, the thermal initiator is present in the mixture from 2 weight percent to 10 weight percent of the mixture. In some embodiments, the thermal initiator is present in the mixture from 2.5 weight percent to 10 weight percent of the mixture. In some embodiments, the thermal initiator is present in the mixture from 3 weight percent to 10 weight percent of the mixture. In some embodiments, the thermal initiator is present in the mixture from 3.5 weight percent to 10 weight percent of the mixture. In some embodiments, the thermal initiator is present in the mixture from 4 weight percent to 10 weight percent of the mixture. In some embodiments, the thermal initiator is present in the mixture from 4.5 weight percent to 10 weight percent of the mixture. In some embodiments, the thermal initiator is present in the mixture from 5 weight percent to 10 weight percent of the mixture. In some embodiments, the thermal initiator is present in the mixture from 5.5 weight percent to 10 weight percent of the mixture. In some embodiments, the thermal initiator is present in the mixture from 6 weight percent to 10 weight percent of the mixture. In some embodiments, the thermal initiator is present in the mixture from 6.5 weight percent to 10 weight percent of the mixture. In some embodiments, the thermal initiator is present in the mixture from 7 weight percent to 10 weight percent of the mixture. In some embodiments, the thermal initiator is present in the mixture from 7.5 weight percent to 10 weight percent of the mixture. In some embodiments, the thermal initiator is present in the mixture from 8 weight percent to 10 weight percent of the mixture. In some embodiments, the thermal initiator is present in the mixture from 8.5 weight percent to 10 weight percent of the mixture. In some embodiments, the thermal initiator is present in the mixture from 9 weight percent to 10 weight percent of the mixture. In some embodiments, the thermal initiator is present in the mixture from 9.5 weight percent to 10 weight percent of the mixture.

In some embodiments, the thermal initiator is present in the mixture from 1 weight percent to 6 weight percent of the mixture. In some embodiments, the thermal initiator is present in the mixture from 2 weight percent to 3 weight percent of the mixture.

The Peroxide

In certain embodiments, the peroxide generates free radicals upon decomposition. In certain embodiments, the acid generated by the thermal generator decomposes the peroxide. Non-limiting examples include peroxyesters and hydroperoxides. Further non-limiting examples include peroxyesters such as t-butyl peroxybenzoate, t-butylperoxy 2-ethylhexanoate, t-butylperoxy 2-ethylhexyl carbonate and cumene hydroperoxide.

In certain embodiments, the peroxide is present in the mixture from 0.1 weight percent to 5 weight percent. In certain embodiments, the peroxide is present in the mixture from 0.2 weight percent to 5 weight percent. In certain embodiments, the peroxide is present in the mixture from 0.3 weight percent to 5 weight percent. In certain embodiments, the peroxide is present in the mixture from 0.4 weight percent to 5 weight percent. In certain embodiments, the peroxide is present in the mixture from 0.5 weight percent to 5 weight percent. In certain embodiments, the peroxide is present in the mixture from 0.6 weight percent to 5 weight percent. In certain embodiments, the peroxide is present in the mixture from 0.7 weight percent to 5 weight percent. In certain embodiments, the peroxide is present in the mixture from 0.8 weight percent to 5 weight percent. In certain embodiments, the peroxide is present in the mixture from 0.9 weight percent to 5 weight percent. In certain embodiments, the peroxide is present in the mixture from 1 weight percent to 5 weight percent. In certain embodiments, the peroxide is present in the mixture from 1.5 weight percent to 5 weight percent. In certain embodiments, the peroxide is present in the mixture from 2 weight percent to 5 weight percent. In certain embodiments, the peroxide is present in the mixture from 2.5 weight percent to 5 weight percent. In certain embodiments, the peroxide is present in the mixture from 3 weight percent to 5 weight percent. In certain embodiments, the peroxide is present in the mixture from 3.5 weight percent to 5 weight percent. In certain embodiments, the peroxide is present in the mixture from 4 weight percent to 5 weight percent. In certain embodiments, the peroxide is present in the mixture from 4.5 weight percent to 5 weight percent.

In certain embodiments, the peroxide is present in the mixture from 1 weight percent to 6 weight percent.

Fillers

In certain embodiments, the mixture further comprises a filler, which is a thixotropic agent. Non-exclusive examples of useful thixotropic agents are include clays such as bentonite, silicates such as sodium silicate, magnesium silicate, fluorine silicate, lithium silicate, silicon dioxide, fumed silicon dioxide (silica), (meth)acrylate functionalized fumed silica, titanates, mineral pigments, polyacrylamide, cellulose acetate propionate (CAP), cellulose acetate butyrate (CAB), acrylamide functionalized CAB, polytetrafluoroethylene (PTFE), boron nitride, or combinations thereof.

In certain embodiments, the filler is present in the mixture from 2.5 weight percent to 8 weight percent. In certain embodiments, the filler is present in the mixture from 3 weight percent to 8 weight percent. In certain embodiments, the filler is present in the mixture from 3.5 weight percent to 8 weight percent. In certain embodiments, the filler is present in the mixture from 4 weight percent to 8 weight percent. In certain embodiments, the filler is present in the mixture from 4.5 weight percent to 8 weight percent. In certain embodiments, the filler is present in the mixture from 5 weight percent to 8 weight percent. In certain embodiments, the filler is present in the mixture from 5.5 weight percent to 8 weight percent. In certain embodiments, the filler is present in the mixture from 6 weight percent to 8 weight percent. In certain embodiments, the filler is present in the mixture from 6.5 weight percent to 8 weight percent. In certain embodiments, the filler is present in the mixture from 7 weight percent to 8 weight percent. In certain embodiments, the filler is present in the mixture from 7.5 weight percent to 8 weight percent.

In certain embodiments, the filler is present in the mixture from 3 weight percent to 5 weight percent.

The Composition

In some embodiments, the present invention is a composition, comprising: at least one polymerizable acrylic compound, wherein the at least one polymerizable acrylic compound is selected from the group consisting of urethane acrylate monomers, methacrylate monomers, urethane acrylate oligomers, and methacrylate oligomers; a thermal initiator, wherein the thermal initiator is selected from the group consisting of salts of dinonylnaphthalene (di)sulfonic acid, hexafluoroantimonate and trifluoromethane sulfonic acid; a photoinitiator, wherein the photoinitiator is an aromatic ketone selected from the group consisting of benzophenone, benzoin, acetoin, acyloin, diketone, xanthone, thioxanthone, ketocoumarin derivatives, Michler's ketone, benzoin methyl ether, benzoin ethyl ether, 2-hydroxy-2-methylpropiophenone, 1-hydroxycyclohexyl phenyl ketone, 2-Hydroxy-2-methyl-1-[4-(1-methylvinyl)phenyl]propanone homopolymer, 2,2-diethoxyacetophenone, camphorquinone, 2-ethylanthraquinone, 2-tert-butylanthraquinone 2,3-dichloro-1,4-naphthoquinone, 2-hydroxy-4'-(2-hydroxyethoxy)-2-methylpropiophenone, methyl benzoylformate, 2,2-dimethoxy-2-phenylacetophenone, 2-ethylhexy-4-(dimethylamino)benzoate, 2-ethyl-4-(dimethylamino)benzoate, 2-isopropylthioxanthone, 4-phenylbenzophenone, 2-benzyl-2-(dimethylamino)-4'-morpholinobutyrophenone, and combinations thereof; and a peroxide, wherein the peroxide is selected from the group consisting of t-butyl peroxybenzoate, t-butylperoxy 2-ethylhexanoate, t-butylperoxy 2-ethylhexyl carbonate and cumene hydroperoxide.

In certain embodiments, the at least one polymerizable acrylic compound is present in the composition from 20 weight percent to 85 weight percent.

In certain embodiments, the at least one polymerizable acrylic compound is present in the composition from 25 weight percent to 85 weight percent. In certain embodiments, the at least one polymerizable acrylic compound is present in the composition from 30 weight percent to 85 weight percent. In certain embodiments, the at least one polymerizable acrylic compound is present in the composition from 35 weight percent to 85 weight percent. In certain embodiments, the at least one polymerizable acrylic compound is present in the composition from 40 weight percent to 85 weight percent. In certain embodiments, the at least one polymerizable acrylic compound is present in the composition from 45 weight percent to 85 weight percent. In certain embodiments, the at least one polymerizable acrylic compound is present in the composition from 50 weight percent to 85 weight percent. In certain embodiments, the at least one polymerizable acrylic compound is present in the composition from 55 weight percent to 85 weight percent. In certain embodiments, the at least one polymerizable acrylic compound is present in the composition from 60 weight percent to 85 weight percent. In certain embodiments, the at least one polymerizable acrylic compound is present in the composition from 65 weight percent to 85 weight percent. In certain embodiments, the at least one polymerizable acrylic compound is present in the composition from 70 weight percent to 85 weight percent. In certain embodiments, the at least one polymerizable acrylic compound is present in the composition from 75 weight percent to 85 weight percent. In certain embodiments, the at least one polymerizable acrylic compound is present in the composition from 80 weight percent to 85 weight percent.

In certain embodiments, the at least one polymerizable acrylic compound is present in the composition from 30 weight percent to 80 weight percent. In certain embodiments, the at least one polymerizable acrylic compound is present in the composition from 40 weight percent to 70 weight percent.

In some embodiments, the photoinitiator is present in the composition from 1 weight percent to 6 weight percent of the composition. In some embodiments, the photoinitiator is present in the composition from 1.5 weight percent to 6 weight percent of the composition. In some embodiments, the photoinitiator is present in the composition from 2 weight percent to 6 weight percent of the composition. In some embodiments, the photoinitiator is present in the composition from 2.5 weight percent to 6 weight percent of the composition. In some embodiments, the photoinitiator is present in the composition from 3 weight percent to 6 weight percent of the composition. In some embodiments, the photoinitiator is present in the composition from 3.5 weight percent to 6 weight percent of the composition. In some embodiments, the photoinitiator is present in the composition from 4 weight percent to 6 weight percent of the composition. In some embodiments, the photoinitiator is present in the composition from 4.5 weight percent to 6 weight percent of the composition. In some embodiments, the photoinitiator is present in the composition from 5 weight percent to 6 weight percent of the composition. In some embodiments, the photoinitiator is present in the composition from 5.5 weight percent to 6 weight percent of the composition.

In some embodiments, the photoinitiator is present in the composition from 1.5 weight percent to 5 weight percent of the composition. In some embodiments, the photoinitiator is present in the composition from 2 weight percent to 4 weight percent of the composition.

In some embodiments, the thermal initiator is present in the composition from 0.1 weight percent to 10 weight percent of the composition. In some embodiments, the thermal initiator is present in the composition from 0.2 weight percent to 10 weight percent of the composition. In some embodiments, the thermal initiator is present in the composition from 0.3 weight percent to 10 weight percent of the composition. In some embodiments, the thermal initiator is present in the composition from 0.4 weight percent to 10 weight percent of the composition. In some embodiments, the thermal initiator is present in the composition from 0.5 weight percent to 10 weight percent of the composition. In some embodiments, the thermal initiator is present in the composition from 0.6 weight percent to 10 weight percent of the composition. In some embodiments, the thermal initiator is present in the composition from 0.7 weight percent to 10 weight percent of the composition. In some embodiments, the thermal initiator is present in the composition from 0.8 weight percent to 10 weight percent of the composition. In some embodiments, the thermal initiator is present in the composition from 0.9 weight percent to 10 weight percent of the composition. In some embodiments, the thermal initiator is present in the composition from 1 weight percent to 10 weight percent of the composition. In some embodiments, the thermal initiator is present in the composition from 1.5 weight percent to 10 weight percent of the composition. In some embodiments, the thermal initiator is present in the composition from 2 weight percent to 10 weight percent of the composition. In some embodiments, the thermal initiator is present in the composition from 2.5 weight percent to 10 weight percent of the composition. In some embodiments, the thermal initiator is present in the composition from 3 weight percent to 10 weight percent of the composition. In some embodiments, the thermal initiator is present in the composition from 3.5 weight percent to 10 weight percent of the composition. In some embodiments, the thermal initiator is present in the composition from 4 weight percent to 10 weight percent of the composition. In some embodiments, the thermal initiator is present in the composition from 4.5 weight percent to 10 weight percent of the composition. In some embodiments, the thermal initiator is present in the composition from 5 weight percent to 10 weight percent of the composition. In some embodiments, the thermal initiator is present in the composition from 5.5 weight percent to 10 weight percent of the composition. In some embodiments, the thermal initiator is present in the composition from 6 weight percent to 10 weight percent of the composition. In some embodiments, the thermal initiator is present in the composition from 6.5 weight percent to 10 weight percent of the composition. In some embodiments, the thermal initiator is present in the composition from 7 weight percent to 10 weight percent of the composition. In some embodiments, the thermal initiator is present in the composition from 7.5 weight percent to 10 weight percent of the composition. In some embodiments, the thermal initiator is present in the composition from 8 weight percent to 10 weight percent of the composition. In some embodiments, the thermal initiator is present in the composition from 8.5 weight percent to 10 weight percent of the composition. In some embodiments, the thermal initiator is present in the composition from 9 weight percent to 10 weight percent of the composition. In some embodiments, the thermal initiator is present in the composition from 9.5 weight percent to 10 weight percent of the composition.

In some embodiments, the thermal initiator is present in the composition from 1 weight percent to 6 weight percent of the composition. In some embodiments, the thermal initiator is present in the composition from 2 weight percent to 3 weight percent of the composition.

In certain embodiments, the peroxide is present in the composition from 1 weight percent to 6 weight percent.

In certain embodiments, the peroxide is present in the composition from 0.1 weight percent to 5 weight percent. In certain embodiments, the peroxide is present in the composition from 0.2 weight percent to 5 weight percent. In certain embodiments, the peroxide is present in the composition from 0.3 weight percent to 5 weight percent. In certain embodiments, the peroxide is present in the composition from 0.4 weight percent to 5 weight percent. In certain embodiments, the peroxide is present in the composition from 0.5 weight percent to 5 weight percent. In certain embodiments, the peroxide is present in the composition from 0.6 weight percent to 5 weight percent. In certain embodiments, the peroxide is present in the composition from 0.7 weight percent to 5 weight percent. In certain embodiments, the peroxide is present in the composition from 0.8 weight percent to 5 weight percent. In certain embodiments, the peroxide is present in the composition from 0.9 weight percent to 5 weight percent. In certain embodiments, the peroxide is present in the composition from 1 weight percent to 5 weight percent. In certain embodiments, the peroxide is present in the composition from 1.5 weight percent to 5 weight percent. In certain embodiments, the peroxide is present in the composition from 2 weight percent to 5 weight percent. In certain embodiments, the peroxide is present in the composition from 2.5 weight percent to 5 weight percent. In certain embodiments, the peroxide is present in the composition from 3 weight percent to 5 weight percent. In certain embodiments, the peroxide is present in the composition from 3.5 weight percent to 5 weight percent. In certain embodiments, the peroxide is present in the composition from 4 weight percent to 5 weight percent. In certain embodiments, the peroxide is present in the composition from 4.5 weight percent to 5 weight percent.

In certain embodiments, the composition further comprises a filler, which is a thixotropic agent. Non-exclusive examples of useful thixotropic agents are include clays such as bentonite, silicates such as sodium silicate, magnesium silicate, fluorine silicate, lithium silicate, silicon dioxide, fumed silicon dioxide (silica), (meth)acrylate functionalized fumed silica, titanates, mineral pigments, polyacrylamide, cellulose acetate propionate (CAP), cellulose acetate butyrate (CAB), acrylamide functionalized CAB, polytetrafluoroethylene (PTFE), boron nitride, or combinations thereof.

In certain embodiments, the filler is present in the composition from 2.5 weight percent to 8 weight percent. In certain embodiments, the filler is present in the composition from 3 weight percent to 8 weight percent. In certain embodiments, the filler is present in the composition from 3.5 weight percent to 8 weight percent. In certain embodiments, the filler is present in the composition from 4 weight percent to 8 weight percent. In certain embodiments, the filler is present in the composition from 4.5 weight percent to 8 weight percent. In certain embodiments, the filler is present in the composition from 5 weight percent to 8 weight percent. In certain embodiments, the filler is present in the composition from 5.5 weight percent to 8 weight percent. In certain embodiments, the filler is present in the composition from 6 weight percent to 8 weight percent. In certain embodiments, the filler is present in the composition from 6.5 weight percent to 8 weight percent. In certain embodiments, the filler is present in the composition from 7 weight percent to 8 weight percent. In certain embodiments, the filler is present in the composition from 7.5 weight percent to 8 weight percent.

In certain embodiments, the filler is present in the composition from 3 weight percent to 5 weight percent.

In some embodiments the composition further comprises a compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth)acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

In certain embodiments, the compound is present in the composition from 5 weight percent to 70 weight percent. In certain embodiments, the compound is present in the composition from 10 weight percent to 70 weight percent. In certain embodiments, the compound is present in the composition from 15 weight percent to 70 weight percent. In certain embodiments, the compound is present in the composition from 20 weight percent to 70 weight percent. In certain embodiments, the compound is present in the composition from 25 weight percent to 70 weight percent. In certain embodiments, the compound is present in the composition from 30 weight percent to 70 weight percent. In certain embodiments, the compound is present in the composition from 35 weight percent to 70 weight percent. In certain embodiments, the compound is present in the composition from 40 weight percent to 70 weight percent. In certain embodiments, the compound is present in the composition from 45 weight percent to 70 weight percent. In certain embodiments, the compound is present in the composition from 50 weight percent to 70 weight percent. In certain embodiments, the compound is present in the composition from 55 weight percent to 70 weight percent. In certain embodiments, the compound is present in the composition from 60 weight percent to 70 weight percent. In certain embodiments, the compound is present in the composition from 65 weight percent to 70 weight percent.

In certain embodiments, the compound is present in the composition from 15 weight percent to 60 weight percent. In certain embodiments, the compound is present in the composition from 25 weight percent to 50 weight percent.

NON-LIMITING EXAMPLES

The following examples are intended to illustrate the invention and should not be construed as limiting the invention in any way.

Example 1

A Mixture According to an Embodiment, and a Method to Cure Thereof

EXAMPLE 1

| | |
|---|---|
| N,N-dimethyl Acrylamide | 6.8 |
| Isobornyl Methacrylate | 5.5 |
| Isobornyl Acrylate | 1.1 |
| N-vinyl Caprolactam | 4.4 |
| Tricyclodecyldimethanol Diacrylate | 3 |
| Stabilizer | 0.1 |
| Photoinitiator 1 | 1.8 |
| Photoinitiator 2 | 1.2 |

EXAMPLE 1-continued

| | |
|---|---|
| Urethane Acrylate Oligomer | 10 |
| Filler | 60 |
| Fumed Silica | 1 |
| Diluent | 2.7 |
| Thermal Initiator | 1.2 |
| Peroxide | 1.2 |
| | 100 |

In a reactor equipped with a both high shear mixing and vacuum capabilities (Ross mixer), the NNDMA, IBOMA, IBOA, NVC and TCDDMDA are added and blended. To this mixture, the stabilizer and both photoinitiators are added and blended until dissolved. The urethane acrylate oligomer is then added and mixed until homogenous. The filler is then dispersed with high shear for several minutes until fully dispersed in the formulation. Fumed silica is then added and dispersed with high shear, creating a thixotropic gel. The material is then cooled and a vacuum applied under low shear to remove any entrapped air.

In a second vessel, the diluent, thermal initiator and peroxide are combined and mixed with low shear until all powder is dissolved. This mixture is then added to the original gel mixture with low shear under vacuum to ensure no air remains entrapped.

Performance:

| Physical Properties | |
|---|---|
| Viscosity (cP) | 47,600 |
| Durometer Hardness | D83 |
| Glass Transition Temperature (° C.) | 83 |
| CTE (um/m * ° C.) | Alpha 1: 31 |
| | Alpha 2: 86 |
| Water Absorption: 2 Hour, 100° C. | 2.80% |
| Tensile (psi) | 3,512 |
| Modulus (psi) | 112,288 |
| Curing Parameters | |
| Curing Method | UV, Heat or UV + Heat |
| Heat Cure Time @ 80° C. | 30 min |
| Pot Life | >7 days RT |
| Storage | 5° C., 3 Months |
| PC to PC Lap Shear | |
| ⅛" Overlap | 171 lbf |
| PC to Al Lap Shear | |
| ¼" Overlap | 232 lbf |

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

What is claimed is:

1. A method, comprising:
   a) forming a mixture by mixing:
      (i) at least one polymerizable acrylic compound,
      (ii) a thermal initiator,
      wherein the thermal initiator has an activation temperature, and
      wherein the thermal initiator dissociates to form an acid when exposed to a temperature equal to or greater than the activation temperature,
      (iii) a photoinitiator which is a phosphine oxide selected from the group consisting of diphenyl (2,4, 6-trimethylbenzoyl) phosphine oxide and phenylbis (2,4,6-trimethylbenzoyl) phosphine oxide, and combinations thereof, and
      (iv) a peroxide having a decomposition temperature,
   b) exposing the mixture to light for a sufficient first time to generate a first curing agent comprising free radicals, wherein the light has a wavelength between 220 nm to 600 nm, and
      wherein the intensity of the light is between 5 mW/cm$^2$ and 10 W/cm$^2$; and
   c) after exposing the mixture to light, exposing the mixture to a temperature equal to or greater than the activation temperature of the thermal initiator and below the decomposition temperature of the peroxide for a sufficient second time for the thermal initiator to generate an acid and for the acid to decompose the peroxide to generate a second curing agent comprising free radicals which may be the same or different from the free radicals of the first curing agent.

2. The method of claim 1, wherein the mixture lacks an active curing agent prior to exposure to at least one of the light or the temperature below the decomposition temperature of the peroxide.

3. The method of claim 1, wherein the sufficient first time is from 5 seconds to 30 seconds.

4. The method of claim 1, wherein the sufficient second time is from 15 to 120 minutes.

5. The method of clam 1, wherein the temperature below the decomposition temperature of the peroxide is from 50 ° C. to 100 ° C.

6. . The method of claim 1, wherein the at least one polymerizable acrylic compound is selected from the group consisting of urethane acrylate monomers, methacrylate monomers, urethane acrylate oligomers, and methacrylate oligomers.

7. The method of claim 1, wherein the at least one polymerizable acrylic compound is from 20 weight percent to 85 weight percent of the mixture.

8. The method of claim 1, wherein the photoinitiator is from 1 weight percent to 6 weight percent of the mixture.

9. The method of claim 1, wherein the thermal initiator is selected from the group consisting of salts of dinonylnaphthalene (di)sulfonic acid, hexafluoroantimonate and trifluoromethane sulfonic acid.

10. The method of claim 1, wherein the thermal initiator is from 0.1 weight percent to 10 weight percent of the mixture.

11. The method of claim 1, wherein the peroxide is selected from the group consisting of t-butyl peroxybenzoate, t-butylperoxy 2-ethylhexanoate, t-butylperoxy 2-ethylhexyl carbonate and cumene hydroperoxide.

12. The method of claim 1, wherein the peroxide is from 0.1 weight percent to 5 weight percent of the mixture.

13. The method of claim 1, wherein a portion of the mixture is not exposed to the light.

14. The method of claim 13, wherein the exposing the mixture to the temperature below the decomposition temperature of the peroxide cures the portion of the mixture that was not exposed to the light.

15. A composition, comprising:
   at least one polymerizable acrylic compound,
      wherein the at least one polymerizable acrylic compound is polymerizable by free radical polymerization and selected from the group consisting of urethane acrylate monomers, methacrylate monomers, urethane acrylate oligomers, and
      methacrylate oligomers, and wherein the at least one polymerizable acrylic compound is from 20 weight percent to 85 weight percent of the mixture;

a thermal initiator,
wherein the thermal initiator has an activation temperature and wherein the thermal initiator dissociates to form an acid when exposed to a temperature equal to or greater than the activation temperature and is selected from the group consisting of salts of dinonylnaphthalene (di)sulfonic acid, hexafluoroantimonate and trifluoromethane sulfonic acid, and
wherein the thermal initiator is from 0.1 weight percent to 10 weight percent of the mixture;

a photoinitiator,
wherein the photoinitiator is selected from the group consisting of benzophenone, benzoin, acetoin, acyloin, diketone, xanthone, thioxanthone, ketocoumarin derivatives, Michler's ketone, benzoin methyl ether, benzoin ethyl ether, 2-hydroxy-2-methylpropiophenone, 1-hydroxycyclohexyl phenyl ketone, 2-Hydroxy-2-methyl-1-[4-(1-methylvinyl)phenyl] propanone homopolymer, 2,2-diethoxyacetophenone, camphorquinone, 2-ethylanthraquinone, 2-tert-butylanthraquinone 2,3-dichloro-1,4-naphthoquinone, 2-hydroxy-4'-(2-hydroxyethoxy)-2-methylpropiophenone, methyl benzoylformate, 2,2-dimethoxy-2-phenylacetophenone, 2-ethylhexy-4-(dimethylamino)benzoate, 2-ethyl-4-(dimethylamino)benzoate, 2-isopropylthioxanthone, 4-phenylbenzophenone, 2-benzyl-2-(dimethylamino)-4'-morpholinobutyrophenone, diphenyl(2,4,6-trimethylbenzoyl)phosphine oxide, phenylbis(2,4,6-trimethylbenzoyl)phosphine oxide, and combinations thereof, and
wherein the photoinitiator is from 1 weight percent to 6 weight percent of the mixture; and a peroxide,
wherein the peroxide is selected from the group consisting of t-butyl peroxybenzoate, t-butylperoxy 2-ethylhexanoate, t-butylperoxy 2-ethylhexyl carbonate and cumene hydroperoxide, and
wherein the peroxide is from 0.1 weight percent to 5 weight percent of the mixture.

16. The method of claim 1, wherein the at least one polymerizable acrylic compound is diluted with a diluent compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth)acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

17. The composition of claim 15, wherein the composition further comprises a diluent compound selected from the group consisting of isobornyl (meth)acrylate, isodecyl (meth)acrylate, lauryl (meth)acrylate, cyclic trimethylolpropane formal acrylate, octyldecyl acrylate, tetrahydrofurfuryl (meth)acrylate, tridecyl (meth)acrylate, 2-hydroxyethyl (meth)acrylate, phenoxyethyl (meth)acrylate, N-vinyl caprolactam, N,N-dimethyl acrylamide, 2(2-ethoxyethoxy) ethyl acrylate, caprolactone acrylate, polypropylene glycol monomethacrylate, 1,3-butylene glycol dimethacrylate, 1,4-butanediol dimethacrylate, 1,6 hexanediol di(meth)acrylate, tricyclodecane dimethanol di(meth)acrylate, tripropylene glycol diacrylate, ethoxylated trimethylolpropane triacrylate, trimethylolpropane triacrylate, tris (2-hydroxy ethyl) isocyanurate triacrylate, 4-hydroxybutyl vinyl ether, cyclohexanedimethanol divinyl ether, octyldecyl vinyl ether, triethyleneglycol divinyl ether, and combinations thereof.

18. A method, comprising:
a) forming a mixture by mixing:
(i) at least one polymerizable acrylic compound,
(ii) a thermal initiator,
wherein the thermal initiator has an activation temperature, and
wherein the thermal initiator dissociates to form an acid when exposed to a temperature equal to or greater than the activation temperature,
(iii) a photoinitiator, and
(iv) a peroxide having a decomposition temperature and is selected from the group consisting of t-butyl peroxybenzoate, t-butylperoxy 2-ethylhexanoate, t-butylperoxy 2-ethylhexyl carbonate and cumene hydroperoxide,
b) exposing the mixture to light for a sufficient first time to generate a first curing agent comprising free radicals, wherein the light has a wavelength between 220 nm to 600 nm, and
wherein the intensity of the light is between 5 mW/cm$^2$ and 10 W/cm$^2$; and
c) after exposing the mixture to light, exposing the mixture to a temperature equal to or greater than the activation temperature of the thermal initiator and below the decomposition temperature of the peroxide for a sufficient second time for the thermal initiator to generate an acid and for the acid to decompose the peroxide to generate a second curing agent comprising free radicals which may be the same or different from the free radicals of the first curing agent.

19. The method of claim 16, wherein the diluent compound is from 5 weight percent to 70 weight percent of the mixture.

20. The composition of claim 17, wherein the diluent compound is from 5 weight percent to 70 weight percent of the composition.

* * * * *